May 10, 1949. J. BRESLAV 2,469,812
ATTACHMENT FOR INDUSTRIAL TRUCKS
Filed Dec. 22, 1945 2 Sheets-Sheet 2
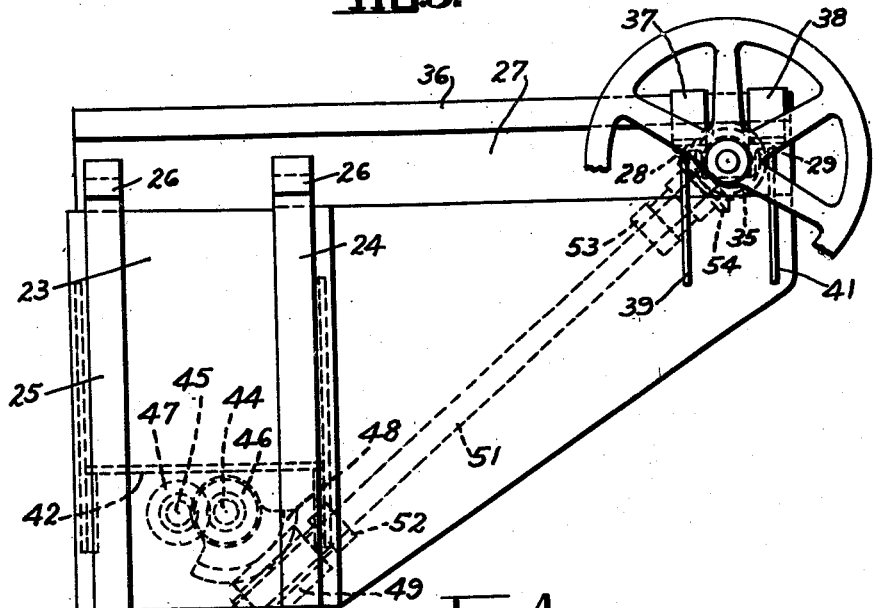
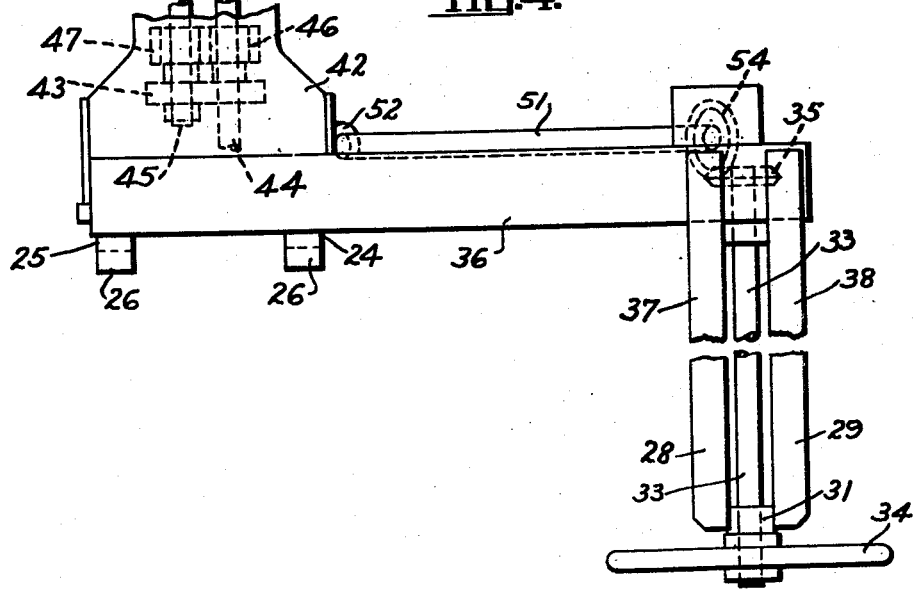
INVENTOR.
Jack Breslav.
BY
Walter S. Edwards.
ATTORNEY.

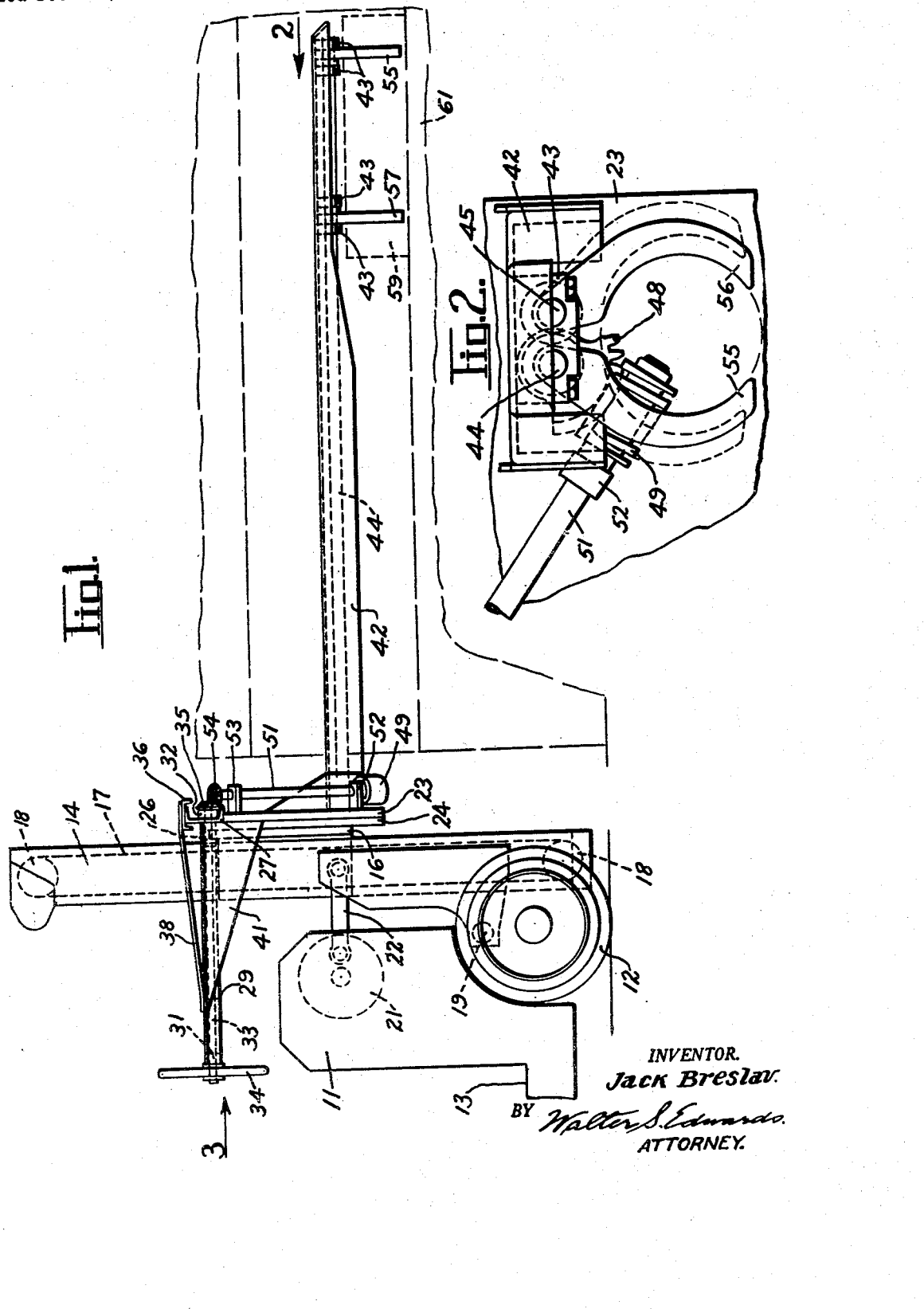

Patented May 10, 1949

2,469,812

UNITED STATES PATENT OFFICE 2,469,812

ATTACHMENT FOR INDUSTRIAL TRUCKS

Jack Breslav, New Haven, Conn.

Application December 22, 1945, Serial No. 636,629

7 Claims. (Cl. 214—66)

This invention relates to attachments for industrial trucks, or the like, and more particularly to an attachment for gripping an article and which is readily applied to such a truck to be raised and lowered thereby, and, by it, moved from one location to another to remove the article gripped by the attachment from one location and dispose it in another location.

A particular use for the truck attachment of this invention is in gripping and moving ingots into and out of a furnace, but it also can be used to advantage for other purposes such as in disposing or removing an article into and out of locations that are restricted in height, width, or both.

One object of this invention is to provide an attachment for an industrial truck of such structure that the operator of the truck may conveniently operate the attachment to grip an article disposed in a restricted location.

Another object of this invention is to provide in an attachment of the above nature means to readily attach it to an industrial truck to be raised and lowered thereby.

A further object is to provide an attachment of the above nature which will be relatively inexpensive to manufacture, simple in construction, of comparatively few parts, compact, and very efficient and durable in use.

With the above and other objects in view, which will appear as the description proceeds, there has been illustrated in the accompanying drawings a form in which the features and principles of this invention may be conveniently embodied in practice.

In the drawings:

Figure 1 is a side view of the front end of an industrial truck of a well-known construction with the attachment, in the structure of which the features and principles of this invention are embodied, shown attached thereto in operable position to remove an ingot from a furnace;

Figure 2 is an enlarged broken end view of the truck attachment of this invention looking in the direction indicated by the arrow 2 of Figure 1;

Figure 3 is an enlarged end view of the truck attachment of this invention looking in the direction indicated by the arrow 3 of Figure 1; and Figure 4 is an enlarged broken top view of the truck attachment of this invention.

Referring now to the drawings wherein like reference numerals designate like parts throughout the several views, the numeral 11 denotes the front body portion of an industrial truck of a well-known make which is self-propelled and adapted to move about on wheels 12. The operator usually stands on a platform 13 extending between the front portion 11 and a rear power unit portion (not shown). This form of truck is provided with an elevating mechanism which includes laterally spaced apart vertical frame members 14, upon which a front plate 16 is adapted to slide. Suitable means, such as chains 17, secured to the back plate 16 running over sprockets 18, are provided to raise and lower the back plate 16 upon the frame members 14. The lower sprocket is power-driven and under the control of the operator. The frame members 14 are arranged to be tilted backwardly by being pivoted adjacent their lower ends on a pivot rod 19 supported by the truck portion 11. A crank disc 21, which is hand or power-driven by the operator, acts through an arm 22 to tilt the frame members 14 out of their vertical position.

The attachment of this invention is provided with a supporting plate 23 having laterally spaced apart vertically disposed bars 24 and 25 secured upon its rear surface, as by welding. The bars 24 and 25 are each provided at their upper end with a hook portion 26 whereby they are adapted to be hooked over the truck front plate 16 and thus be detachably secured to and supported thereby. A channel beam 27 secured to the top of the plate 23 extends laterally away therefrom to be positioned to one side of the truck frame 14, when the attachment is mounted on the front plate 16.

Angle bars 28 and 29, secured at one end to the beam 27, extend rearwardly therefrom and are spaced apart to embrace a bearing sleeve 31 between their rear ends. The bearing sleeve 31 and a bearing sleeve 32, secured to the beam 27 support a horizontal shaft 33. The shaft 33 has a hand wheel 34 secured upon its rear end and a bevel gear 35 secured upon its front end. The length of the angle bars 28 and 29 is such that the hand wheel 34 is positioned in relation to the front body portion 11 of the truck to be readily manipulated by the operator of the truck while standing on the platform 13. Another beam 36 is mounted on top of the beam 27 to brace it and strips 37 and 38 secured to the beam 36 each extend at an angle downwardly from the beam 36 over one of the angle bars 28 and 29 respectively to brace them, the rear ends of the strips 37 and 38 being secured to the respective angle bars. Triangular plates 39 and 41 are secured along one of their edges one to each angle bar 28 and 29 respectively and along another of their edges to the supporting plate 23 to assist in bracing and supporting the bars 28 and 29.

An inverted U-shaped, or channel, member 42 secured at one end to the lower portion of the supporting plate 23. Bearing blocks 43 spaced apart lengthwise of the channel member 42 support a pair of laterally spaced apart shafts 44 and 45. The shafts 44 and 45 extend from the front end of the channel member 42 rearwardly to adjacent the supporting plate 23 whereat they are drivingly connected by gears 46 and 47 secured on the shafts 44 and 45 respectively. The shaft 45 has a worm gear segment 48 secured to its rear end in position to be in mesh with a worm 49 secured to the lower end of a shaft 51. The shaft 51 is journaled in bearing blocks 52 and 53, the former block 52 being secured to the plate 23 adjacent the end of the channel member 42 at the plate 23 and the block 53 being secured to the plate 23 adjacent the bevel gear 35. The shaft 51 extends angularly upward from the gear segment 48 to the bevel gear 35 and at its upper end has a bevel gear 54 secured thereto which is in mesh with the bevel gear 35, whereby manipulation of the hand wheel 34 will rotate the shafts 44 and 45 in the direction desired.

Opposed and cooperating article gripping arms 55 and 56 are secured one to the outer end of each of the shafts 44 and 45 respectively and opposed and cooperating article gripping arms 57, one only showing in Figure 1, are secured one to each of the shafts 44 and 45 respectively and are spaced rearwardly from the arms 55 and 56. Closing movement of the opposing pairs of arms, 55, 56 and 57 by manipulation of the hand wheel 34 will cause them to grip an article which is in a restricted space and spaced forwardly a considerable distance from the front end of the truck, such as an ingot 59 (dotted lines in Figure 1) disposed in a furnace 61 (dark lines in Figure 1). After so gripping an article 59 it may be raised from its support and withdrawn from its location by operation of the truck, due to the attachment being secured to the truck, by the operator of the truck at his operating position on the platform 13.

By the use of the attachment of this invention, a truck operator, at his station on the platform 13, may cause the channel member 42 and with it the arms 55, 56, and 57 to enter a restricted space by proper driving operation of the truck to which the attachment is secured. Then by operating the raising and lowering mechanism of the truck to effect the front plate 16 cause the channel member to move into position so that the arms 55, 56, and 57 will embrace an article and then by manipulation of the hand wheel 34 cause the arms 55, 56, and 57 to grip the article 59. Then by raising the channel member 42, the gripped article can be removed, by operation of the truck, from the location and moved to another. By providing a detachable attachment the truck may be used for other purposes.

While there has been shown and described herein one form in which the features and principles of this invention may be conveniently and practically embodied, it is to be understood that they may be embodied in other specific forms without departing from the spirit and essential attributes thereof, and it is therefore desired that the present embodiment be considered in all respects as illustrative, and not restrictive, reference being had to the claims rather than to the foregoing description to indicate the scope of the invention.

Having thus fully described the invention what is claimed as new, and for which it is desired to secure Letters Patent, is:

1. An attachment for an industrial truck having an operator's position and a movable truck part operable by the operator and adapted to be raised and lowered, said attachment comprising, as a unit, the combination of a base plate adapted to be detachably secured to said movable truck part, an elongated supporting member secured to and extending forwardly from said base plate, article gripping means carried by said supporting member adjacent its remote end, a second supporting member extending rearwardly from said base plate to one side of said movable truck part, mechanism to actuate said gripping means to grip and to release an article, said mechanism mounted on said base plate and including a shaft extending rearwardly from said face plate, and means on the remote end of said shaft and located adjacent the operator's position to actuate said mechanism.

2. In combination, an industrial truck having a front body portion, and a truck member mounted on the front body portion of the truck and adapted to be raised and lowered, a base member detachably secured to said truck member to move therewith, an article gripping mechanism secured to and extending forwardly from the base member, a mechanism actuating device secured to and extending rearwardly from said base member and to one side and past the truck member, and means carried by the base member to drivingly connect the article gripping mechanism and the mechanism actuating device.

3. In combination, an industrial truck having a front body portion, and a truck member mounted on the front body portion of the truck and adapted to be raised and lowered, an article gripping mechanism secured to and extending forwardly of the truck body portion, a mechanism actuating device secured to and extending rearwardly in respect to and past the truck front body portion to one side of the truck member, means to drivingly connect the article gripping member and the mechanism actuating device, and common base means adapted to be detachably secured to the truck member to carry said article gripping mechanism, said mechanism actuating device, and said connecting means and secure them to the front body portion of the truck for movement therewith.

4. In an attachment for an industrial truck having a vertically movable front member, a base plate adapted to be detachably secured to said truck front member, a first arm carried by and extending forwardly from said base plate, parallel shafts carried by said arm, an article gripping finger secured to the outer end of each shaft, a gear pinion on the rear end of each shaft and intermeshed to drivingly connect said shafts, a gear segment on the rear end of one of said shafts, a second arm carried by and extending rearwardly from said base plate above and to one side of the first arm, a shaft carried by said second arm, means on the outer rear end of said shaft to rotate it, and means drivingly connecting said shaft with said gear segment to actuate said article gripping fingers.

5. In an attachment for an industrial truck having a vertically movable front member, a base plate adapted to be detachably secured to said truck front member, a first arm carried by and extending forwardly from said base plate, parallel shafts carried by said arm, an article gripping finger secured to the outer end of each shaft, a gear pinion on the rear end of each shaft and intermeshed to drivingly connect said shafts, a gear segment on the rear end of one of said shafts, a second arm carried by and extending rearwardly from said base plate above and to one side of the first arm, a shaft carried by said second arm, means on the outer rear end of said shaft to rotate it, a bevel gear on the forward end of said first shaft, a second shaft extending diagonally downwardly from the forward end of said first shaft and having a bevel gear on its upper end in mesh with the bevel gear on said first shaft and a worm gear on its lower end in mesh with said gear segment.

6. An attachment for an industrial truck having a vertically movable front member, said attachment comprising, as a unit, the combination of a base plate readily attachable to the truck front member, a first arm carried by and extending forwardly from said base plate, article gripping means at the forward end of said first arm, mechanism carried by the arm and extending rearwardly from the article gripping means to the base plate to actuate said article gripping means, a second arm extending rearwardly from said base plate and past one side of the truck front member, mechanism to actuate said article gripping means carried by said second arm, and means carried by said base plate to operably connect said article gripping means actuating mechanisms.

7. An attachment for an industrial truck having a vertically movable front member, said attachment comprising as a unit, the combination of a base plate adapted to be detachably secured to the truck front member, said base plate having a first arm extending forwardly away therefrom and a second arm extending rearwardly from the base plate past one of the sides of the truck front member, article engaging means carried by the first arm and disposed at the front end thereof, means to actuate said article gripping means carried by and adjacent the rear end of said second arm and mechanism operably connecting the article engaging means with the article engaging means actuating means.

JACK BRESLAV.

REFERENCES CITED

The following references are of record in the file of this patent:

UNITED STATES PATENTS

| Number | Name | Date |
|---|---|---|
| 551,831 | Morgan | Dec. 24, 1895 |
| 1,075,923 | Litzenberg | Oct. 14, 1913 |
| 1,518,560 | Carroll | Dec. 9, 1924 |
| 2,178,369 | Dunham | Oct. 31, 1939 |
| 2,314,792 | Korner | Mar. 23, 1943 |
| 2,319,456 | Hazen | May 18, 1943 |
| 2,368,122 | Dunham | Jan. 30, 1945 |
| 2,368,615 | Reese | Feb. 6, 1945 |
| 2,386,759 | Ulm | Oct. 16, 1945 |

FOREIGN PATENTS

| Number | Country | Date |
|---|---|---|
| 160,510 | Germany | May 13, 1905 |